(12) United States Patent
Ishioka et al.

(10) Patent No.: US 11,260,865 B2
(45) Date of Patent: Mar. 1, 2022

(54) VEHICLE CONTROL DEVICE

(71) Applicant: HONDA MOTOR CO., LTD., Tokyo (JP)

(72) Inventors: Atsushi Ishioka, Wako (JP); Kanta Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 16/800,746

(22) Filed: Feb. 25, 2020

(65) Prior Publication Data

US 2020/0269844 A1 Aug. 27, 2020

(30) Foreign Application Priority Data

Feb. 27, 2019 (JP) .............................. JP2019-033501

(51) Int. Cl.
| B60W 30/18 | (2012.01) |
|---|---|
| B60W 10/20 | (2006.01) |
| B60W 50/14 | (2020.01) |
| B60W 40/09 | (2012.01) |
| B60W 50/10 | (2012.01) |

(52) U.S. Cl.
CPC ...... B60W 30/18163 (2013.01); B60W 10/20 (2013.01); B60W 40/09 (2013.01); B60W 50/10 (2013.01); B60W 50/14 (2013.01); B60W 2520/10 (2013.01); B60W 2540/30 (2013.01)

(58) Field of Classification Search
CPC ........... B60W 30/18163; B60W 10/20; B60W 40/09; B60W 50/10; B60W 50/14; B60W 2520/10; B60W 2540/30
See application file for complete search history.

(56) References Cited

U.S. PATENT DOCUMENTS

| 10,160,452 | B2 | 12/2018 | Kubota et al. |
|---|---|---|---|
| 2013/0110343 | A1 | 5/2013 | Ichikawa et al. |
| 2016/0091896 | A1* | 3/2016 | Maruyama ............ B60W 50/10 701/23 |
| 2019/0354108 | A1 | 11/2019 | Okajima et al. |
| 2020/0096355 | A1 | 3/2020 | Mishina et al. |

FOREIGN PATENT DOCUMENTS

| JP | 5382218 B2 | 1/2014 |
|---|---|---|
| JP | 2017-211301 A | 11/2017 |
| JP | 2018-100867 A | 6/2018 |
| JP | 2018-149915 A | 9/2018 |
| JP | 2018-180613 A | 11/2018 |
| JP | 2018-203118 A | 12/2018 |
| WO | 2018/138765 A1 | 8/2018 |
| WO | 2018/179415 A1 | 10/2018 |

OTHER PUBLICATIONS

Office Action dated Nov. 4, 2020 issued over the corresponding Japanese Patent Application No. 2019-033501 with the English translation thereof.

* cited by examiner

*Primary Examiner* — Michael D Lang
(74) *Attorney, Agent, or Firm* — Carrier Blackman & Associates, P.C.; Joseph P. Carrier; Jeffrey T. Gedeon

(57) ABSTRACT

A vehicle control device includes a control instruction unit (ALC switch) that gives an instruction to perform one of lane change assistance control in which guidance of lane change is provided to a vehicle occupant through a notification unit (HMI) and automated lane change control in which travel control required for movement from a travel lane to a target lane is automatically performed as lane change control performed in the lane change in accordance with vehicle occupant's operation.

14 Claims, 11 Drawing Sheets

VEHICLE CONTROL DEVICE

CROSS-REFERENCE TO RELATED APPLICATION

This application is based upon and claims the benefit of priority from Japanese Patent Application No. 2019-033501 filed on Feb. 27, 2019, the contents of which are incorporated herein by reference.

BACKGROUND OF THE INVENTION

Field of the Invention

The present invention relates to a vehicle control device that can automatically perform vehicle control of at least one of acceleration, deceleration, and steering regarding lane change of a host vehicle.

Description of the Related Art

A vehicle control device that performs vehicle control of acceleration, deceleration, and steering regarding lane change of a host vehicle partially or entirely on the basis of a control state that is set has been recently developed. Japanese Patent No. 5382218 discloses a device that, if a destination is set, generates a route where a host vehicle performs automated driving to the destination and, if the destination is not set, generates a route where the host vehicle follows a road.

SUMMARY OF THE INVENTION

An automated driving function or a driving assistance function required for a vehicle is different depending on vehicle occupants. For example, as for the lane change, some vehicle occupants want to decide the timing of the lane change by himself/herself and the other vehicle occupants want to leave it to the vehicle.

The present invention has been made in view of the above situation, and an object is to provide a vehicle control device that can perform lane change as a vehicle occupant likes.

A vehicle control device according to an aspect of the present invention includes: an automated driving instruction unit configured to give an instruction to start automated driving in accordance with a vehicle occupant's operation; a destination setting unit configured to set a destination in accordance with the vehicle occupant's operation; an automated driving control unit configured to automatically perform vehicle control of at least one of acceleration, deceleration, and steering regarding lane change of a host vehicle as the automated driving, and if the automated driving instruction unit gives the instruction to start the automated driving, cause the host vehicle to travel in the automated driving to the destination that is set by the destination setting unit; a notification unit configured to notify a vehicle occupant of information; and a control instruction unit configured to give an instruction to perform automated lane change control in which travel control required for movement from a travel lane to a target lane is automatically performed as lane change control performed in the lane change in accordance with the vehicle occupant's operation, wherein when the automated driving to the destination that is set by the destination setting unit is performed, if the instruction by the control instruction unit is given, the automated driving control unit is configured to perform the automated lane change control, and if the instruction is not given by the control instruction unit, the automated driving control unit is configured to perform lane change assistance control in which guidance of the lane change is provided to the vehicle occupant through the notification unit.

According to the present invention, the lane change can be performed as the vehicle occupant likes.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a vehicle control device according to the present invention is hereinafter described in detail with reference to the attached drawings.

[1. Outline of Vehicle Control Device 10]

Figure 1:
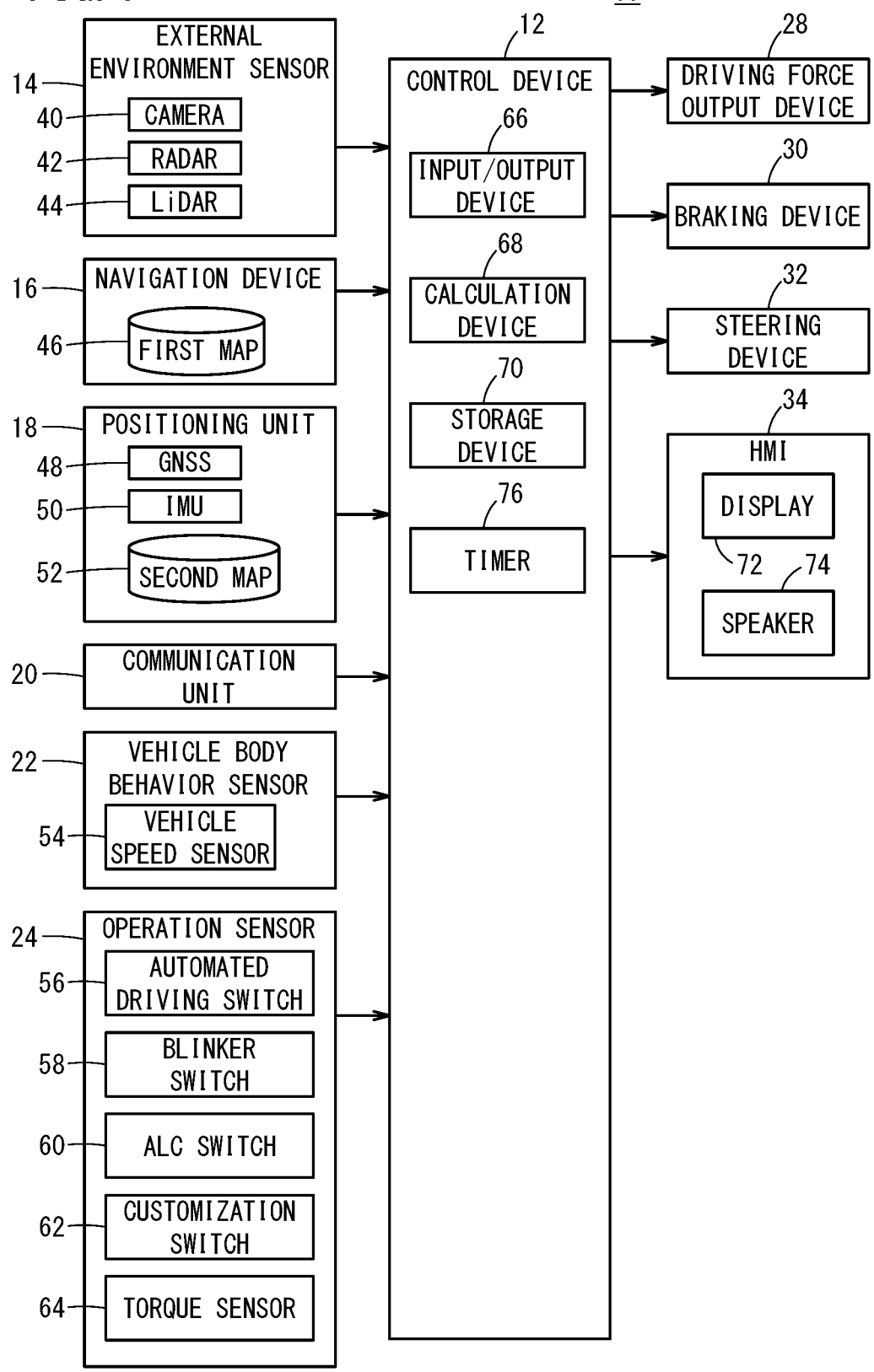
FIG. 1 is a block diagram of a vehicle control device according to a present embodiment.

A vehicle control device 10 illustrated in FIG. 1 can switch the driving between manual driving in which travel control (vehicle control of acceleration, deceleration, and steering) of a host vehicle 100 (FIG. 4) is performed by a vehicle occupant, and automated driving in which at least a part of the travel control is automatically performed. Moreover, the vehicle control device 10 is designed to be able to select one of a plurality of automated driving types (hereinafter, referred to as automated driving mode). The vehicle control device 10 sets one automated driving mode in accordance with the intention of the vehicle occupant, a state of the host vehicle 100, a situation of an external environment, or the like, and performs the control that can be performed in the set automated driving mode.

[2. Configuration of Vehicle Control Device 10]

A configuration of the vehicle control device 10 is described with reference to FIG. 1. The vehicle control device 10 includes a control device 12, an input device group that inputs various pieces of information to the control device 12, and an output device group that operates the host vehicle 100 on the basis of the various pieces of information output from the control device 12. The input device group includes an external environment sensor 14, a navigation device 16, a positioning unit 18, a communication unit 20, a vehicle body behavior sensor 22, and an operation sensor 24. The output device group includes a driving force output device 28, a braking device 30, a steering device 32, and an HMI 34.

[2.1. Configuration of Input Device Group]

Figure 4:
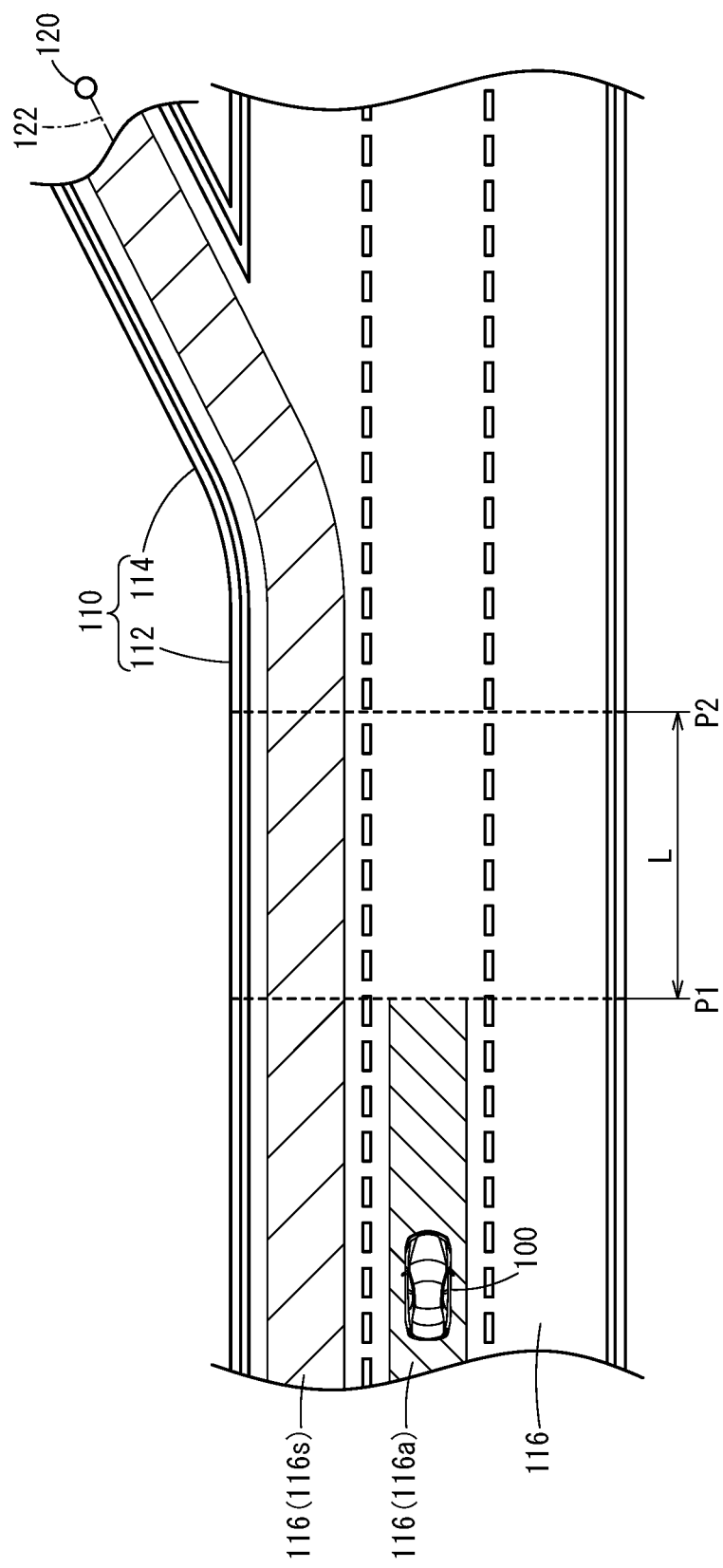
FIG. 4 is an explanatory diagram describing a lane change in a branch route.

The external environment sensor 14 includes one or more cameras 40, one or more radars 42, and one or more LiDARs 44. The camera 40 photographs a peripheral environment of the host vehicle 100, and outputs image information to the control device 12. The radar 42 and the LiDAR 44 detect a target around the host vehicle 100, and output detection information to the control device 12. The navigation device 16 specifies the position of the host vehicle 100 by GPS or the like, generates a travel route 122 (FIG. 4) from the position of the host vehicle 100 to a destination 120 (FIG. 4) designated by the vehicle occupant with reference to map information of a first map 46, and outputs travel route information to the control device 12. The positioning unit 18 outputs to the control device 12, positional information that expresses the position of the host vehicle 100 specified by a GNSS 48 and an IMU 50, and map information of a second map 52. Note that the second map 52 includes the map information that is more accurate and specific than that of the first map 46, and includes the number of lanes, a lane position, lane width, or the like about a road 110 (FIG. 4). The communication unit 20 includes a communication device that receives information broadcasted by a broadcasting station, a communication device that receives information transmitted by a road-side machine that is disposed on the road 110, and a communication device that receives information transmitted by vehicles other than the host vehicle 100. The communication unit 20 outputs the received various pieces of information to the control device 12.

The vehicle body behavior sensor 22 includes various sensors that measure behavior of the host vehicle 100, for example, a vehicle speed sensor 54 that detects vehicle speed V of the host vehicle 100, a yaw rate sensor (not shown) that detects a yaw rate of the host vehicle 100, or the like. The vehicle body behavior sensor 22 outputs detected various pieces of information to the control device 12.

The operation sensor 24 includes an automated driving switch 56, a blinker switch 58, an ALC (Auto Lane Change) switch 60, a customization switch 62, and various sensors that detect the operation amount of operation elements (accelerator pedal, brake pedal, and steering wheel). Examples of the various sensors include a torque sensor 64.

The automated driving switch 56 outputs to the control device 12, instruction information in accordance with the vehicle occupant's operation of the switch, or more specifically, instruction information expressing an instruction to perform or stop the automated driving. The blinker switch 58 outputs to the control device 12, information in accordance with operation of a blinker lever. The information in accordance with the operation of the blinker lever is information expressing a blink instruction for a blinker lamp in the manual driving and information expressing the vehicle occupant's intention regarding lane change control (performing control, stopping control, and approving or disapproving control) in the automatic travel control in the automated driving.

The ALC switch 60 is a touch screen provided to a display of the navigation device 16 or other display, or a hardware switch provided to the steering wheel or an instrument panel (dashboard). The ALC switch 60 outputs to the control device 12, instruction information in accordance with the vehicle occupant's operation of the switch, or more specifically, instruction information expressing whether to perform lane change assistance control or automated lane change control to be described in [2.5] below. The ALC switch 60 is an on/off switch. In an on state, the ALC switch 60 outputs the instruction information about the automated lane change control, and in an off state, the ALC switch 60 outputs the instruction information about the lane change assistance control. The customization switch 62 outputs to the control device 12, instruction information in accordance with the vehicle occupant's operation of the switch, or more specifically, instruction information expressing setting a change for the lane change. The torque sensor 64 is provided to a steering shaft, for example, detects steering torque generated due to the vehicle occupant's operation of the steering wheel, and outputs detected torque information to the control device 12.

[2.2. Configuration of Control Device 12]

The control device 12 is configured by an ECU. The control device 12 includes an input/output device 66, a calculation device 68, a storage device 70, and a timer 76. The input/output device 66 includes an A/D conversion circuit, a communication interface, a driver, or the like. The calculation device 68 includes a processor including a CPU or the like, for example. The calculation device 68 executes programs stored in the storage device 70, so that various functions are achieved. The various functions of the calculation device 68 are described in [2.4] below. The storage device 70 includes a RAM, a ROM, or the like. The storage device 70 stores various programs, numerical information such as a threshold that is used in a process performed by the calculation device 68, and various counters.

[2.3. Configuration of Output Device Group]

The driving force output device 28 includes a driving force output ECU and an actuator (including a traction motor, a throttle valve, or the like) to be controlled by the driving force output ECU. The driving force output device 28 adjusts driving force in accordance with the vehicle occupant's operation of the accelerator pedal or instruction information (driving instruction) that is output from the control device 12.

The braking device 30 includes a braking ECU and an actuator (including brake actuator or the like) to be controlled by the braking ECU. The braking device 30 adjusts braking force in accordance with the vehicle occupant's operation of the brake pedal or instruction information (braking instruction) that is output from the control device 12.

The steering device 32 includes an electric power steering (EPS) ECU and an actuator (including EPS actuator or the like) to be controlled by the EPS ECU. The steering device 32 adjusts a steering angle in accordance with the vehicle occupant's operation of the steering wheel or instruction information (steering instruction) that is output from the control device 12.

The HMI 34 includes a display 72 and a speaker 74. The display 72 outputs video information in accordance with instruction information (notification instruction) that is output from the control device 12. The display 72 may be an input device including the touch screen. In this case, the display 72 may display the automated driving switch 56, the ALC switch 60, and the customization switch 62. The speaker 74 outputs audio information in accordance with the instruction information (notification instruction) that is output from the control device 12.

[2.4. Various Functions of Calculation Device 68]

Figure 2:
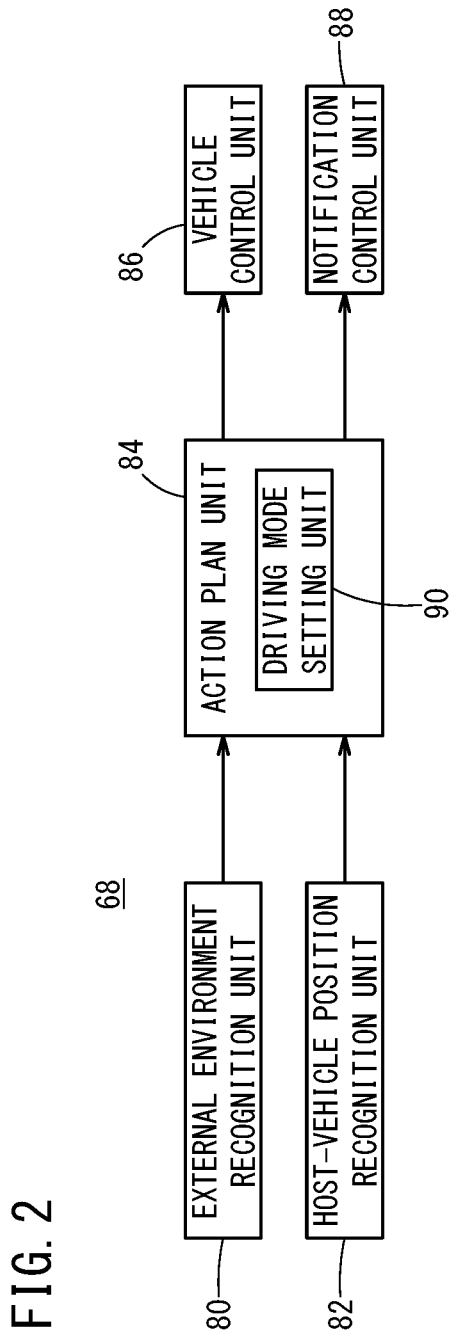
FIG. 2 is a function block diagram of a calculation device.

The various functions achieved by the calculation device 68 are described with reference to FIG. 2. The calculation device 68 functions as an external environment recognition unit 80, a host vehicle position recognition unit 82, an action plan unit 84, a vehicle control unit 86, and a notification control unit 88.

The external environment recognition unit 80 recognizes a state around the host vehicle 100 on the basis of the image information and the detection information output from the external environment sensor 14. The host vehicle position recognition unit 82 recognizes the position of the host vehicle 100 on the basis of the positional information and the map information output from the navigation device 16 or the positioning unit 18.

The action plan unit 84 generates a local map (dynamic map) that includes static information and dynamic information around the host vehicle 100 on the basis of recognition result from the external environment recognition unit 80 and the host vehicle position recognition unit 82. Then, the action plan unit 84 decides the optimum action on the basis of the local map and the state of the host vehicle 100 (vehicle speed V, steering angle, and position), and calculates the travel speed (or acceleration/deceleration) to perform the action and generates a travel trajectory.

The action plan unit 84 also functions as a driving mode setting unit 90 that selects and sets one of the predetermined automated driving modes. The various automated driving modes are described in [2.5] below. The driving mode setting unit 90 stores the latest automated driving mode in the storage device 70 temporarily. The action plan unit 84 determines that the latest automated driving mode stored in the storage device 70 is the automated driving mode that is currently set, and causes the output device group to perform the control in the range permitted in the automated driving mode.

The vehicle control unit 86 calculates the acceleration/deceleration in order to cause the host vehicle 100 to travel at the travel speed calculated by the action plan unit 84, and the steering angle in order to cause the host vehicle 100 to travel along the travel trajectory generated by the action plan unit 84. Note that if the action plan unit 84 calculates the acceleration/deceleration, the vehicle control unit 86 does not need to calculate the acceleration/deceleration. The vehicle control unit 86 outputs instruction information about the acceleration/deceleration and the steering angle to the driving force output device 28, the braking device 30, and the steering device 32 through the input/output device 66. If the action decided by the action plan unit 84 requires the notification, the notification control unit 88 outputs instruction information expressing notification contents to the HMI 34 through the input/output device 66.

[2.5. Types of Automated Driving Mode]

Figure 3:
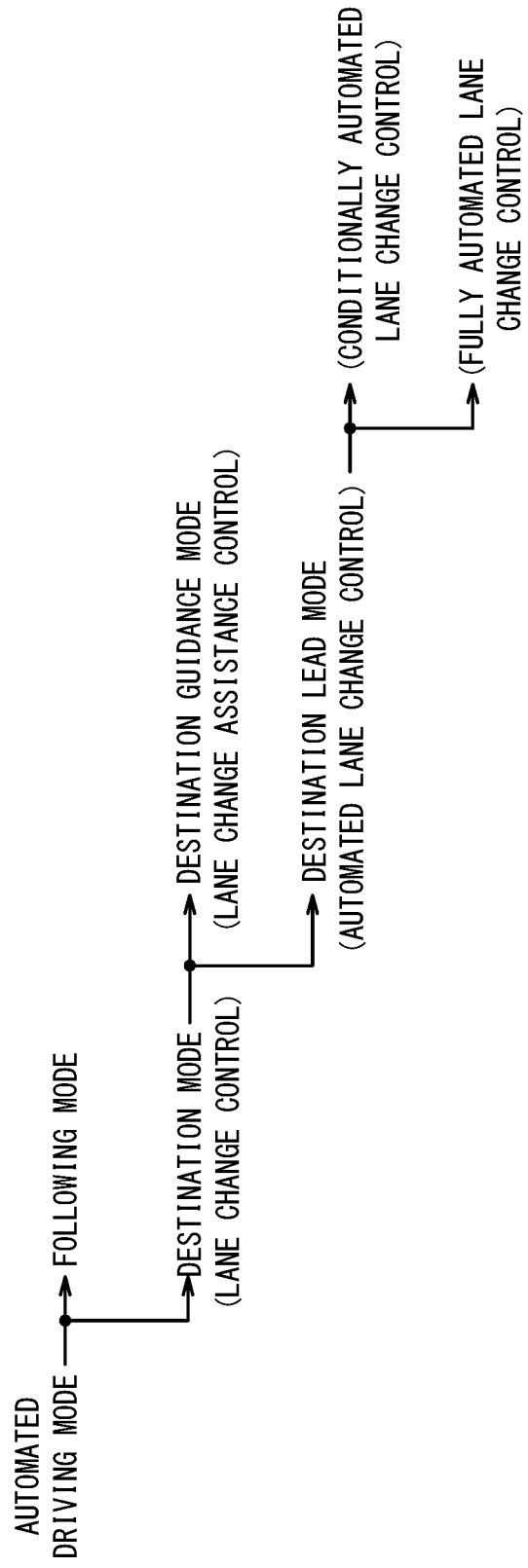
FIG. 3 is an explanatory diagram describing an automated driving mode.

The automated driving mode that is set by the driving mode setting unit 90 is classified from some viewpoints. From the viewpoint of automation of moving control (steering control) in a lateral direction of the host vehicle 100, the automated driving mode is classified into a following mode and a destination mode as illustrated in FIG. 3. The following mode is the automated driving mode in which the host vehicle 100 follows the current route in a case where the destination 120 is not set. On the other hand, the destination mode is the automated driving mode in which the host vehicle 100 is caused to reach the destination 120 that is set by the navigation device 16. This destination mode is further classified into a destination guidance mode and a destination lead mode that are different from each other in control (lane change control and left/right turn control) regarding route change (lane change and left/right turn).

The destination guidance mode is the automated driving mode in which the destination 120 is set, lane keep control and acceleration/deceleration control of the host vehicle 100 are automatically performed, and the lane change assistance control is performed in a route change, for example, a lane change. The lane change assistance control is the control in which the calculation device 68 provides the guidance of the lane change to the vehicle occupant through the HMI 34. If the vehicle occupant operates the blinker switch 58 in accordance with the guidance, the blinker switch 58 instructs the calculation device 68 to perform the travel control regarding the lane change. At this time, the calculation device 68 outputs to the driving force output device 28, the braking device 30, and the steering device 32, instruction information to move the host vehicle 100 from a travel lane to a target lane, so that the host vehicle 100 moves to the target lane. That is to say, in the destination guidance mode, the vehicle occupant determines a lane change timing and the device performs the travel control necessary for the movement to the target lane. In this manner, the guidance of the lane change and the vehicle occupant's operation of the blinker switch 58 are repeatedly performed, so that the host vehicle 100 changes lanes and reaches the destination 120. Similar control is also performed for the left/right turn.

The destination lead mode is the automated driving mode in which the host vehicle 100 autonomously travels along the travel route 122 that is set in advance. In the destination lead mode, if the lane change is necessary, the automated lane change control is performed. The automated lane change control is the control in which the action plan unit 84 determines the lane change timing or lane change position on the basis of the position, the peripheral situation, and the travel route 122 of the host vehicle 100, and the travel control necessary for the movement from the travel lane to the target lane is performed automatically. That is to say, in the destination lead mode, the device determines the lane change timing and performs the travel control necessary for the movement to the target lane. Here, the automated lane change control is classified into conditionally automated lane change control (first automated lane change control) and fully automated lane change control (second automated lane change control).

The conditionally automated lane change control is the lane change control in which the vehicle occupant is asked whether to change lanes before the travel control necessary for the movement to the target lane, and only if the lane change is approved, the travel control necessary for the movement to the target lane is performed. In the present embodiment, the vehicle occupant approves the lane change by using the blinker switch 58. For example, the operation of the blinker switch 58 may be regarded as the approval, and the nonoperation of the blinker switch 58 may be regarded as the disapproval. Alternatively, the nonoperation of the blinker switch 58 may be regarded as the approval, and the operation of the blinker switch 58 may be regarded as the disapproval. Moreover, the operation of the blinker switch 58 to a lane change direction may be regarded as the approval, and the operation of the blinker switch 58 to the other side may be regarded as the disapproval. Note that a device other than the blinker switch 58 may be used.

On the other hand, the fully automated lane change control is the lane change control in which the travel control necessary for the movement to the target lane is performed mainly by the device without asking the vehicle occupant whether to change lanes.

Note that the classification of the automated driving mode, the lane change control, and the automated lane change control is not limited to the example in FIG. 3.

In the present embodiment, it is assumed that the vehicle occupant selects any one of the destination guidance mode and the destination lead mode by using the ALC switch 60. In the description below, it is assumed that the fully automated lane change control is performed in the destination lead mode. However, the conditionally automated lane change control may be performed in the destination lead mode, and the vehicle occupant may be able to select one of the two types of control.

A specific example of the lane change control performed in the automated driving mode is described with reference to FIG. 4. Here, it is assumed that the destination 120 is set ahead of a branch route 114 that is branched from a main lane 112 of the road 110. A recommended lane 116s is set in the road 110 of the travel route 122 from the position of the host vehicle 100 to the destination 120. Moreover, if the road 110 includes a plurality of lanes 116, a substitution lane 116a is set in addition to the recommended lane 116s. The recommended lane 116s is the lane 116 in which the moving distance from the position of the host vehicle 100 to the destination 120 becomes the shortest. If the branch route 114 is present, the lane 116 that directly connects to the branch route 114 is regarded as the recommended lane 116s. The substitution lane 116a is the travel lane adjacent to the recommended lane 116s. If the recommended lane 116s is separated from the main lane 112 at a branch point P2, the set substitution lane 116a ends at a point P1 that is more on the host vehicle 100 side than the branch point P2 by a predetermined distance L. The predetermined distance L is a distance from a point where the host vehicle 100 starts the lane change to a point where the host vehicle 100 ends the lane change. The predetermined distance L is decided in accordance with the vehicle speed V of the host vehicle 100.

If the following mode is set, the destination 120 is not set. Thus, the vehicle control device 10 causes the host vehicle 100 to travel along the main lane 112 of the road 110.

If the destination guidance mode is set, the vehicle control device 10 causes the host vehicle 100 to travel along the travel route 122. In this case, the vehicle control device 10 causes the host vehicle 100 to travel in the recommended lane 116s basically, but also in the substitution lane 116a depending on a traffic situation. If the host vehicle 100 needs to enter the branch route 114 but is traveling in the substitution lane 116a, the vehicle control device 10 performs the automated lane change control before the host vehicle 100 reaches the point P1. If the host vehicle 100 cannot perform the automated lane change control before the point P1, the vehicle control device 10 does not perform the automated lane change control. For example, the vehicle control device 10 changes the automated driving mode from the destination lead mode to the destination guidance mode. In addition, if another vehicle travels at lower speed ahead of the host vehicle 100, the vehicle control device 10 performs the automated lane change control to the adjacent travel lane.

[3. Process of Vehicle Control Device 10]

In each process to be described below, the input device group described in [2.1] acquires various pieces of information periodically. Moreover, the external environment recognition unit 80 and the host vehicle position recognition unit 82 perform the recognition process periodically.

[3.1. First Example (Automated Driving Start Process)]

Figure 5:
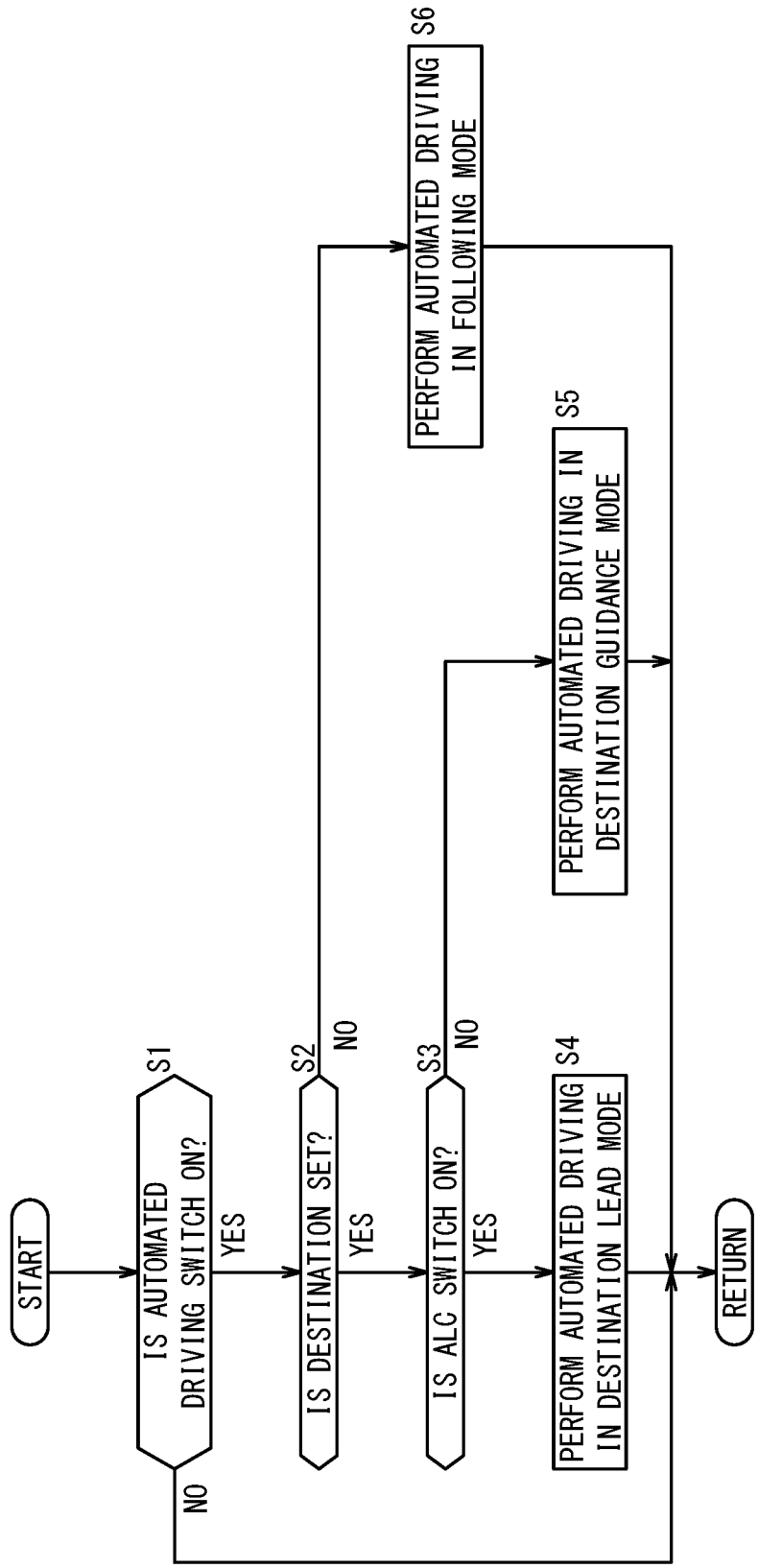
FIG. 5 is a flowchart of a process to be performed in a first example.

An automated driving start process is described with reference to FIG. 5. The process in FIG. 5 is performed on a predetermined cycle when the state is not in an automated driving state where the vehicle control device 10 performs all of the driving force output control, the braking control, and the steering control, that is, when the automated driving is not started.

In step S1, the driving mode setting unit 90 determines whether the automated driving switch 56 has been turned on, on the basis of the instruction information output from the automated driving switch 56. If the automated driving switch 56 has been turned on (step S1: YES), the process advances to step S2. On the other hand, if the automated driving switch 56 has not been turned on (step S1: NO), the process ends once.

In step S2, the driving mode setting unit 90 determines whether the destination 120 has been set by the navigation device 16. If the destination 120 has been set (step S2: YES), the process advances to step S3. On the other hand, if the destination 120 has not been set (step S2: NO), the process advances to step S6.

In step S3, the driving mode setting unit 90 determines whether the automated lane change needs to be performed on the basis of the instruction information output from the ALC switch 60. If the ALC switch 60 is in the on state (step S3: YES), the process advances to step S4. On the other hand, if the ALC switch 60 is in the off state (step S3: NO), the process advances to step S5.

In step S4, the driving mode setting unit 90 sets the destination lead mode as the automated driving mode. At this time, the driving mode setting unit 90 causes the storage device 70 to store the fact that the current automated driving mode is the destination lead mode. The action plan unit 84 and the vehicle control unit 86 perform the automated driving in accordance with the destination lead mode.

In step S5, the driving mode setting unit 90 sets the destination guidance mode as the automated driving mode. At this time, the driving mode setting unit 90 causes the storage device 70 to store the fact that the current automated driving mode is the destination guidance mode. The action plan unit 84 and the vehicle control unit 86 perform the automated driving in accordance with the destination guidance mode.

In step S6, the driving mode setting unit 90 sets the following mode as the automated driving mode. At this time, the driving mode setting unit 90 causes the storage device 70 to store the fact that the current driving mode is the following mode. The action plan unit 84 and the vehicle control unit 86 perform the automated driving in accordance with the following mode.

[3.2. Second Example (Modification of Automated Driving Start Process)]

Figure 6:
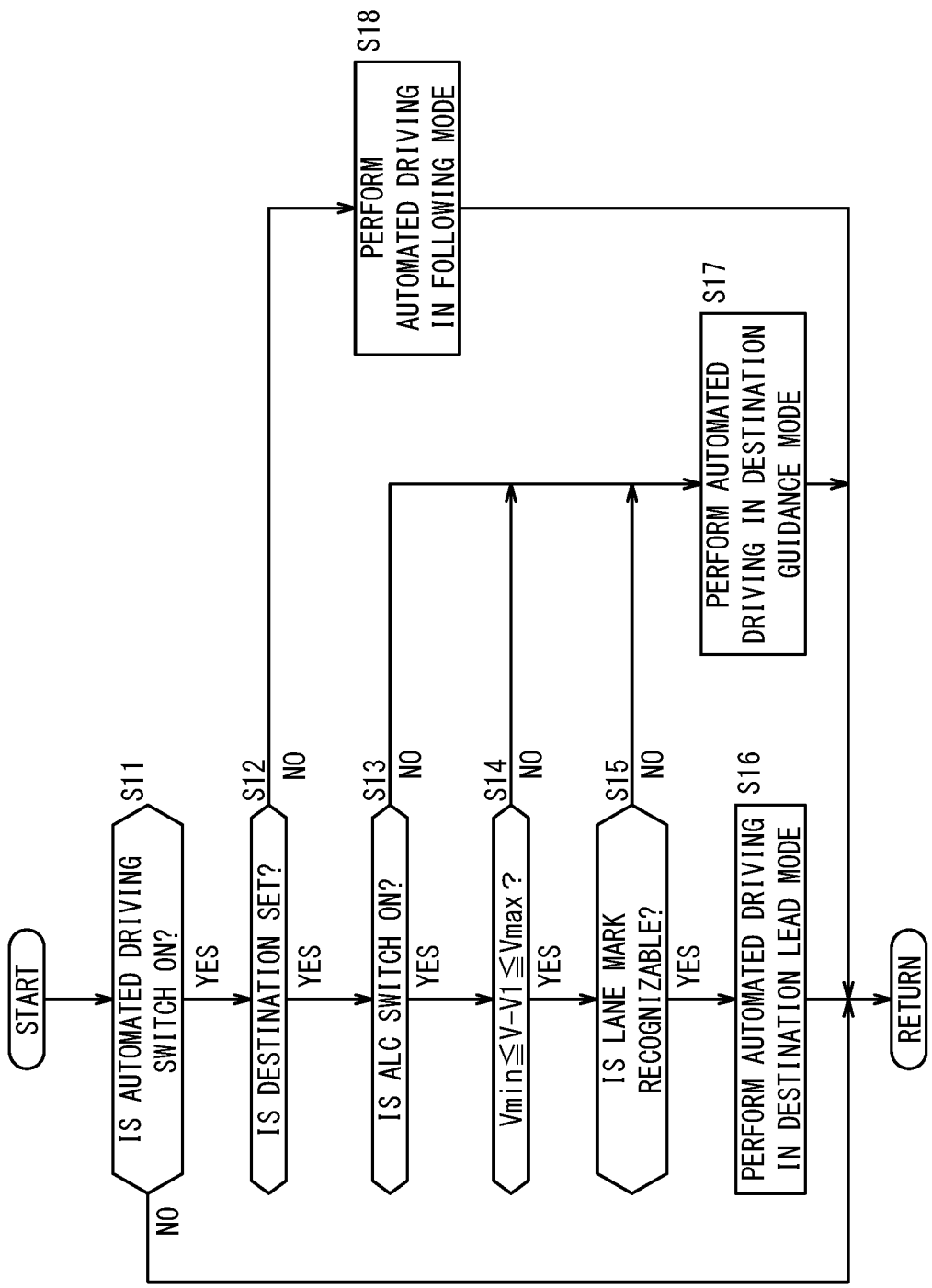
FIG. 6 is a flowchart of a process to be performed in a second example.

A modification of the automated driving start process is described with reference to FIG. 6. In the process in FIG. 6, determination in step S14 and step S15 is added to the process in FIG. 5. The process in step S11 to step S13 and step S16 to step S18 in FIG. 6 is the same as the process in step S1 to step S6 in FIG. 5. Thus, the description thereof is omitted.

If the process advances from step S13 to step S14, the driving mode setting unit 90 determines whether the information detected by the vehicle body behavior sensor 22 satisfies a predetermined condition. Here, it is determined whether the difference (V−V1) between the vehicle speed V detected by the vehicle speed sensor 54 and vehicle speed V1 of another vehicle traveling in the target lane is more than or equal to a predetermined lower limit value Vmin (<0) and less than or equal to an upper limit value Vmax (>0). The range from the lower limit value Vmin to the upper limit value Vmax is the range of a speed condition in which the lane change control can be performed, and the allowable range of relative speed between the host vehicle 100 and the other vehicle. Note that instead of the vehicle speed V1 of the other vehicle, the legal speed limit obtained from the map information of the first map 46 or the map information of the second map 52 may be used. If Vmin≤(V−V1)≤Vmax is satisfied (step S14: YES), the process advances to step S15. On the other hand, if (V−V1)<Vmin or Vmax<(V−V1) is satisfied (step S14: NO), the process advances to step S17.

In step S15, the driving mode setting unit 90 determines whether the information detected by the external environment sensor 14 satisfies a predetermined condition. Here, it is determined whether the external environment recognition unit 80 has recognized a lane mark. The external environment recognition unit 80 recognizes the presence or absence of the lane mark on the basis of the image information photographed by the camera 40. If the lane mark has been recognized (step S15: YES), the process advances to step S16. On the other hand, if the lane mark has not been recognized (step S15: NO), the process advances to step S17.

[3.3. Third Example (Process 1 after Automated Driving is Started)]

Figure 7:
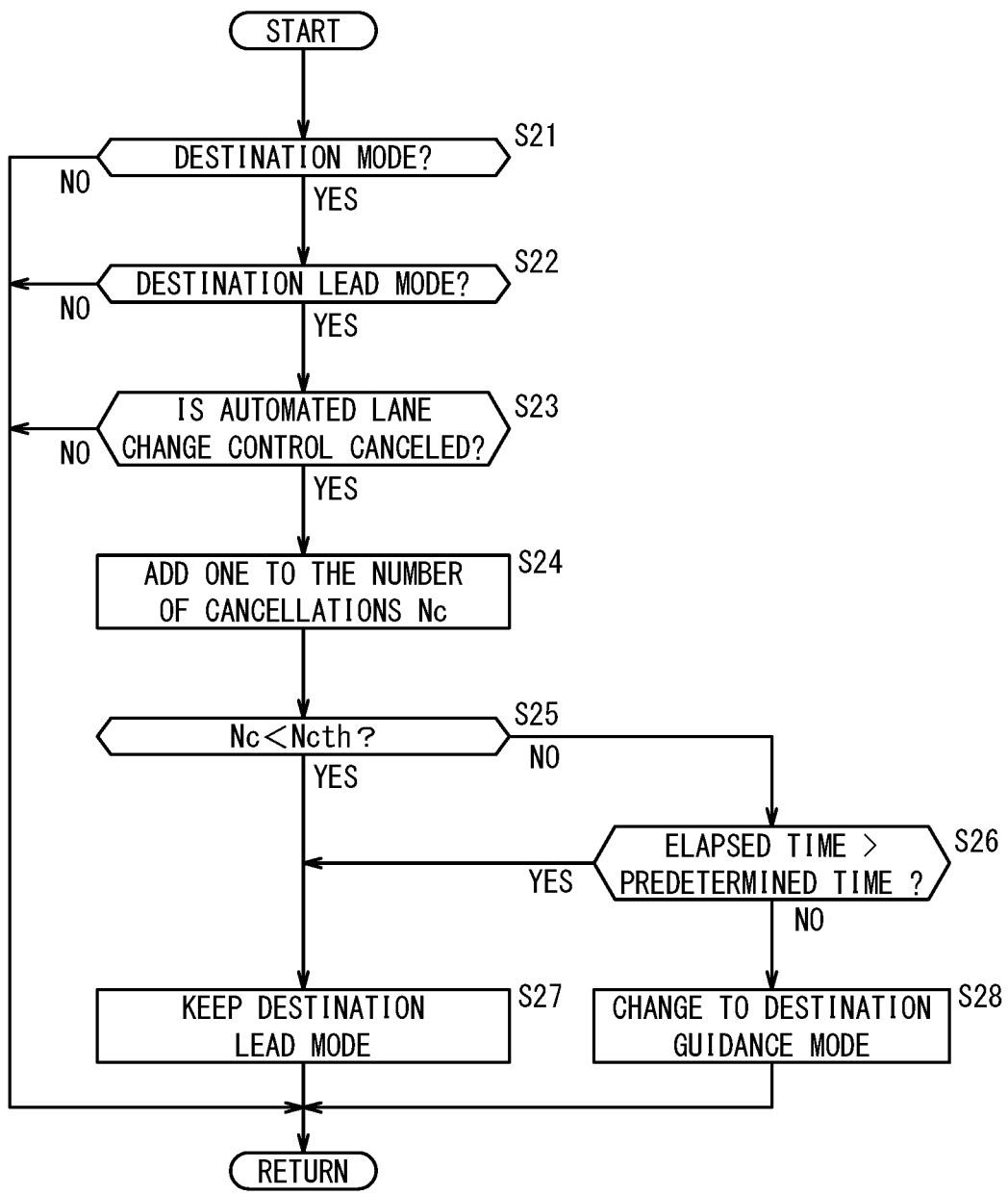
FIG. 7 is a flowchart of a process to be performed in a third example.

One example of the process to be performed after the automated driving is started in the first example or the second example is described with reference to FIG. 7. The third example is effective in a case where the vehicle occupant wants to set the lane change timing by himself/herself but the destination lead mode is set against the vehicle occupant's intention, for example. The process in FIG. 7 is performed on a predetermined cycle after the automated driving is started.

In step S21, the driving mode setting unit 90 determines whether the current automated driving is the destination mode. If the current automated driving is the destination mode (step S21: YES), the process advances to step S22. On the other hand, if the current automated driving is not the destination mode, that is, the current automated driving is the following mode (step S21: NO), the process ends once.

In step S22, the driving mode setting unit 90 determines whether the current automated driving is the destination lead mode. If the current automated driving is the destination lead mode (step S22: YES), the process advances to step S23. On the other hand, if the current automated driving is not the destination lead mode, that is, the current automated driving is the destination guidance mode (step S22: NO), the process ends once.

In step S23, the driving mode setting unit 90 determines whether the vehicle occupant has canceled the automated lane change control. Before the host vehicle 100 moves from the travel lane to the target lane (before the front wheel goes over the lane mark), if the blinker switch 58 has been operated to the direction opposite to the lane change direction or if the steering wheel has been steered to the direction opposite to the lane change direction, the action plan unit 84 cancels the automated lane change control. If a canceling operation of the automated lane change control has been performed (step S23: YES), the process advances to step S24. On the other hand, if the canceling operation of the automated lane change control has not been performed (step S23: NO), the process ends once.

In step S24, the driving mode setting unit 90 adds one to the number of cancellations Nc that indicates the number of times the automated lane change control has been cancelled. In addition, the driving mode setting unit 90 records elapsed time measured by the timer 76, and starts to measure the time after the timer 76 is reset. In a case where the canceling operation of the automated lane change control is performed for the first time, the elapsed time measured by the timer 76 is zero.

In step S25, the driving mode setting unit 90 compares the number of cancellations Nc and a predetermined number of times Ncth. If Nc<Ncth is satisfied (step S25: YES), the process advances to step S27. On the other hand, if Nc Ncth is satisfied (step S25: NO), the process advances to step S26.

In step S26, the driving mode setting unit 90 compares the elapsed time measured by the timer 76 and a predetermined time stored in the storage device 70. If the elapsed time is more than the predetermined time (step S26: YES), the process advances to step S27. On the other hand, if the elapsed time is less than or equal to the predetermined time (step S26: NO), the process advances to step S28.

In step S27, the driving mode setting unit 90 keeps the destination lead mode as the automated driving mode. On the other hand, in step S28, the driving mode setting unit 90 changes the automated driving mode from the destination lead mode to the destination guidance mode.

The automated driving mode may be changed when the number of cancellations Nc is one. That is to say, if the cancel operation is performed at least once, the driving mode setting unit 90 may change the automated driving mode from the destination lead mode to the destination guidance mode. Moreover, the process in step S26 may be omitted.

In the above embodiment, the number of cancellations Nc is counted, and a time interval of the cancel operation is measured. Alternatively, the number of interventions Ni that indicates the number of times the travel control has been intervened using the steering wheel may be counted, and a time interval of the intervention operation may be measured. Whether the intervention to the travel control using the steering wheel has occurred is determined on the basis of the steering torque detected by the torque sensor 64. If the steering torque to the lane change direction or the other direction is more than a threshold, it can be determined that the intervention has occurred.

Note that if a predetermined time has passed or the host vehicle 100 has traveled by a predetermined distance after the counting the number of cancellations Nc or the number of interventions Ni is started, the number of cancellations Nc or the number of times Ni of the intervention may be reset.

If the automated lane change control is canceled the predetermined number of times Ncth, Nith, or more, there is a possibility that the vehicle occupant does not want to perform the automated lane change control. Moreover, there is a possibility that the vehicle occupant mistakenly operates the ALC switch 60, so that the destination lead mode is set. These possibilities are assumed in the third example. Thus, the automated driving mode is temporarily changed to the destination guidance mode to deal with these possibilities.

Figure 11:
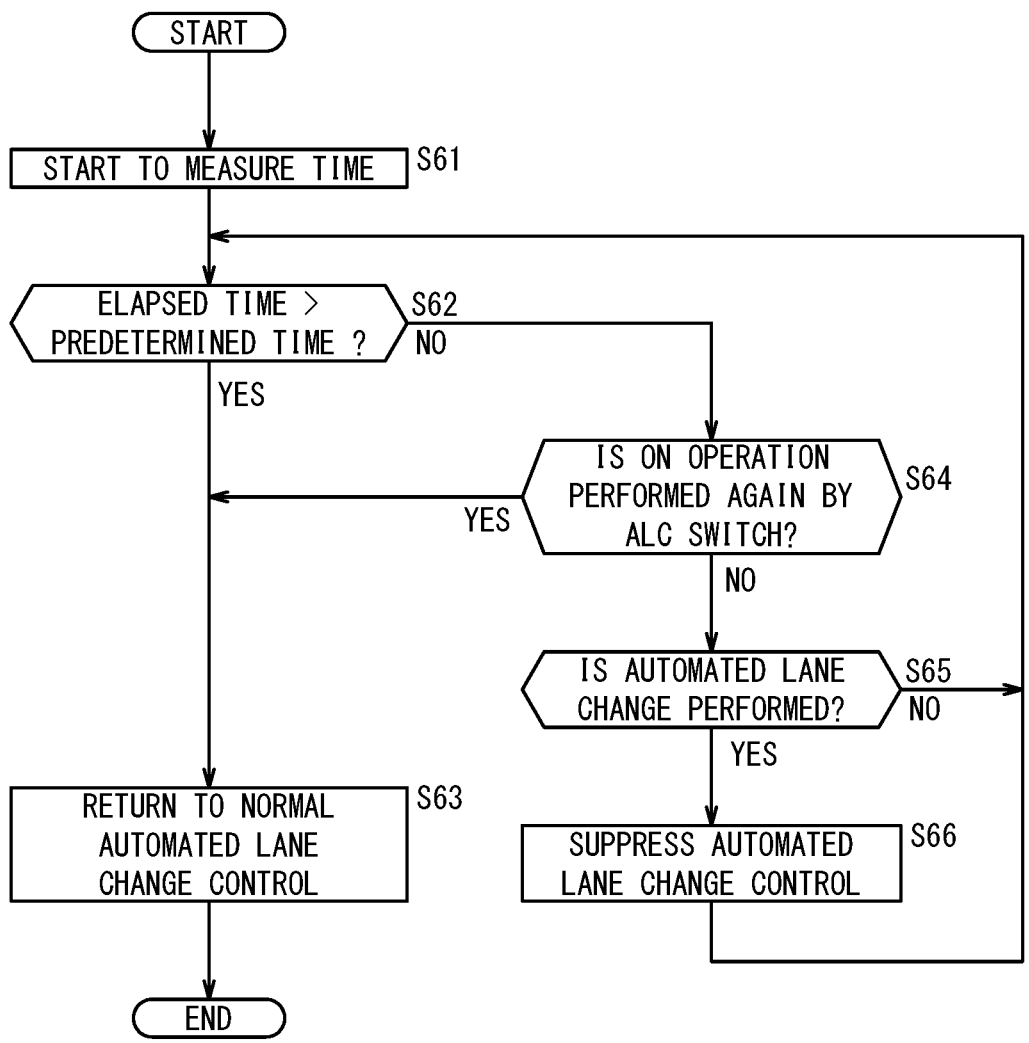
FIG. 11 is a flowchart of a process to be performed in parallel with the process in the third example.

In the process in step S23 in FIG. 7, if the operation of canceling the automated lane change control has been performed (step S23: YES), a series of the following processes (see FIG. 11) may be performed in parallel.

In step S61, the driving mode setting unit 90 causes the timer 76 to start to measure the time. The timer 76 that is used here may be the same as or different from the timer 76 that is used in step S24.

In step S62, the driving mode setting unit 90 compares elapsed time measured by the timer 76 and a predetermined time stored in the storage device 70. The predetermined time used here may be the same as or different from the predetermined time used in step S26. If the elapsed time is more than the predetermined time (step S62: YES), the process advances to step S63. On the other hand, if the elapsed time is less than or equal to the predetermined time (step S62: NO), the process advances to step S64.

In step S63, if a suppression mode of the automated lane change control is set in step S65 to be described below, the driving mode setting unit 90 returns the mode to the mode of the normal automated lane change control. The series of the processes in FIG. 11 ends here.

On the other hand, if the process advances from step S62 to step S64, the driving mode setting unit 90 determines whether the vehicle occupant has requested the automated lane change again on the basis of the instruction information output from the ALC switch 60. Specifically, the driving mode setting unit 90 determines whether the on operation has been performed again by the ALC switch 60 after the timer 76 starts to measure the time. If the on operation has been performed again by the ALC switch 60 (step S64: YES), the process advances to step S63. On the other hand, if the on operation has not been performed again by the ALC switch 60 (step S64: NO), the process advances to step S65.

In step S65, the driving mode setting unit 90 determines whether the automated lane change can be performed in the current situation. If the automated lane change can be performed in the current situation (step S65: YES), the process advances to step S66. On the other hand, if the automated lane change cannot be performed in the current situation (step S65: NO), the process returns to step S62.

In step S66, the driving mode setting unit 90 sets the suppression mode of the automated lane change control. If the suppression mode is set, the control amount of the automated lane change control calculated by the action plan unit 84 is suppressed. For example, the acceleration in the lane change may be suppressed, the steering amount may be suppressed, or the timing of starting the lane change may be later than usual. After the automated lane change ends, the process returns to step S62.

[3.4. Fourth Example (Process 2 after Automated Driving is Started)]

Figure 8:
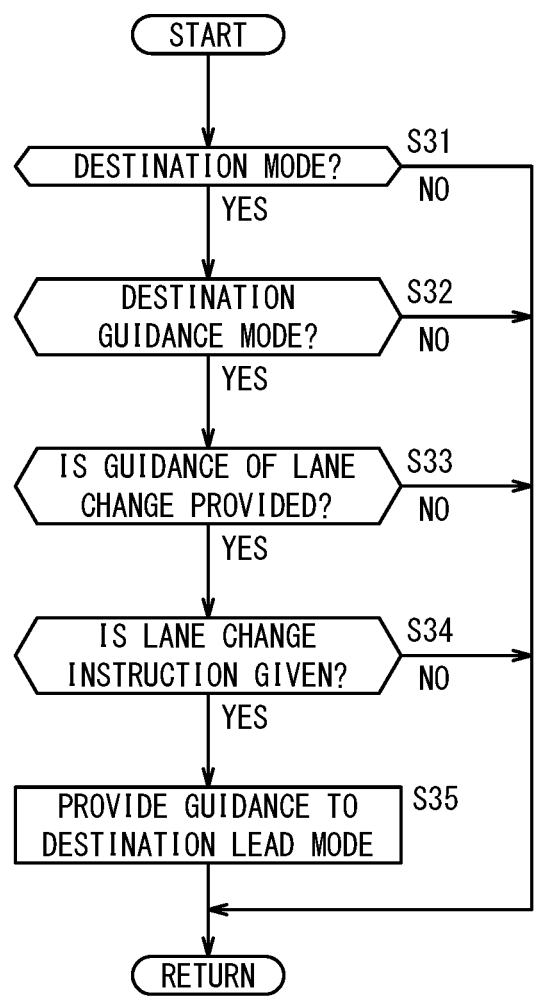
FIG. 8 is a flowchart of a process to be performed in a fourth example.

One example of the process to be performed after the automated driving is started in the first example or the second example is described with reference to FIG. 8. As opposed to the third example, the fourth example is effective in a case where the vehicle occupant wants to cause the vehicle control device 10 to set the lane change timing but the destination guidance mode is set against the vehicle occupant's intention, for example. The process in FIG. 8 is performed on a predetermined cycle after the automated driving is started.

In step S31, the driving mode setting unit 90 determines whether the current automated driving is the destination mode. If the current automated driving is the destination mode (step S31: YES), the process advances to step S32. On the other hand, if the current automated driving is not the destination mode, that is, the current automated driving is the following mode (step S31: NO), the process ends once.

In step S32, the driving mode setting unit 90 determines whether the current automated driving is the destination guidance mode. If the current automated driving is the destination guidance mode (step S32: YES), the process advances to step S33. On the other hand, if the current automated driving is not the destination guidance mode, that is, the current automated driving is the destination lead mode (step S32: NO), the process ends once.

In step S33, the driving mode setting unit 90 determines whether the guidance of the lane change has been provided through the HMI 34 within a predetermined time. If the guidance has been provided (step S33: YES), the process advances to step S34. On the other hand, if the guidance has not been provided (step S33: NO), the process ends once.

In step S34, the driving mode setting unit 90 determines whether the lane change instruction is given by the vehicle occupant. If the vehicle control device 10 causes the host vehicle 100 to travel in the destination guidance mode, the operation of the blinker switch 58 to the lane change direction means the vehicle occupant's instruction to perform the lane change automatically. If the lane change instruction is given (step S34: YES), the process advances to step S35. On the other hand, if the lane change instruction is not given (step S34: NO), the process ends once.

In step S35, the notification control unit 88 outputs to the HMI 34, the notification instruction to provide the guidance of the change to the destination lead mode. The HMI 34 provides the guidance in accordance with the notification instruction.

[3.5. Fifth Example (Customization)]

The vehicle occupant can set an operation condition of the automated lane change control to be performed in the destination lead mode by using the customization switch 62. For example, if a preceding vehicle travels ahead of the host vehicle 100 at the speed that is lower than the vehicle speed V of the host vehicle 100, it is possible to set whether the automated lane change control to overtake the preceding vehicle is performed. Note that if the setting is not changed by the customization switch 62, an initial condition (performing automated lane change control) is set.

[3.6. Sixth Example (Process 3 after Automated Driving is Started)]

Figure 9:
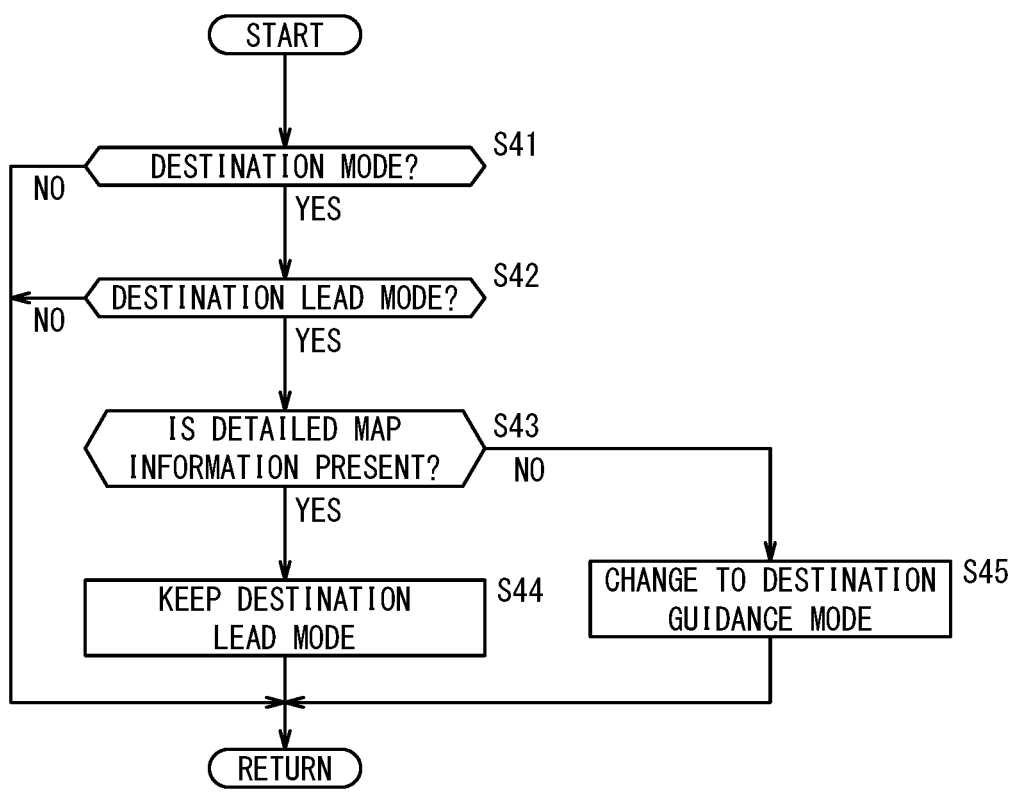
FIG. 9 is a flowchart of a process to be performed in a sixth example.

One example of the process to be performed after the automated driving is started in the first example or the second example is described with reference to FIG. 9. The sixth example is effective in a case where the map information with high accuracy is not present. The process in FIG. 9 is performed on a predetermined cycle after the automated driving is started.

In step S41, the driving mode setting unit 90 determines whether the current automated driving is the destination mode. If the current automated driving is the destination mode (step S41: YES), the process advances to step S42. On the other hand, if the current automated driving is not the destination mode, that is, the current automated driving is the following mode (step S41: NO), the process ends once.

In step S42, the driving mode setting unit 90 determines whether the current automated driving is the destination lead mode. If the current automated driving is the destination lead mode (step S42: YES), the process advances to step S43. On the other hand, if the current automated driving is not the destination lead mode, that is, the current automated driving is the destination guidance mode (step S42: NO), the process ends once.

In step S43, the driving mode setting unit 90 determines whether the detailed map information including the position of the host vehicle 100 is present. Here, it is determined whether the second map 52 includes the positional information of the host vehicle 100. If the second map 52 includes the positional information of the host vehicle 100 (step S43: YES), the process advances to step S44. On the other hand, if the second map 52 does not include the positional information of the host vehicle 100 (step S43: NO), the process advances to step S45.

In step S44, the driving mode setting unit 90 keeps the destination lead mode as the automated driving mode. On the other hand, in step S45, the driving mode setting unit 90 changes the automated driving mode from the destination lead mode to the destination guidance mode.

[3.7. Seventh Example (Process 4 after Automated Driving is Started)]

Figure 10:
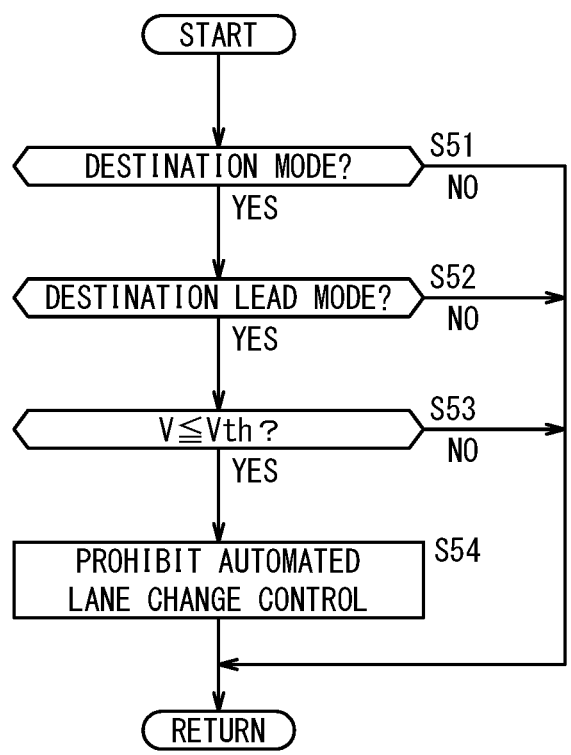
FIG. 10 is a flowchart of a process to be performed in a seventh example.

One example of the process to be performed after the automated driving is started in the first example or the second example is described with reference to FIG. 10. The seventh example is effective in a case where the relative speed between the host vehicle 100 and the other vehicle traveling in the target lane is large, for example. The process in FIG. 10 is performed on a predetermined cycle after the automated driving is started.

In step S51, the driving mode setting unit 90 determines whether the current automated driving is the destination mode. If the current automated driving is the destination mode (step S51: YES), the process advances to step S52. On the other hand, if the current automated driving is not the destination mode, that is, the current automated driving is the following mode (step S51: NO), the process ends once.

In step S52, the driving mode setting unit 90 determines whether the current automated driving is the destination lead mode. If the current automated driving is the destination lead mode (step S52: YES), the process advances to step S53. On the other hand, if the current automated driving is not the destination lead mode, that is, the current automated driving is the destination guidance mode (step S52: NO), the process ends once.

In step S53, the driving mode setting unit 90 compares the vehicle speed V detected by the vehicle speed sensor 54 with a predetermined vehicle speed Vth stored in the storage device 70. If V≤Vth is satisfied (step S53: YES), the process advances to step S54. On the other hand, if V>Vth is satisfied (step S53: NO), the process ends once.

In step S54, the driving mode setting unit 90 prohibits the automated lane change control by the destination lead mode. At this time, the driving mode setting unit 90 may change the automated driving mode from the destination lead mode to the destination guidance mode or the following mode.

[4. Technical Concept Obtained from Embodiment]

The technical concept that is obtained from the above embodiment is hereinafter described.

The vehicle control device 10 according to an aspect of the present invention includes: the automated driving instruction unit (automated driving switch 56) configured to give the instruction to start the automated driving in accordance with the vehicle occupant's operation; the destination setting unit (navigation device 16) configured to set the destination 120 in accordance with the vehicle occupant's operation; the automated driving control unit (calculation device 68) configured to automatically perform the vehicle control of at least one of the acceleration, the deceleration, and the steering regarding the lane change of the host vehicle 100 as the automated driving, and if the automated driving instruction unit (automated driving switch 56) gives the instruction to start the automated driving, cause the host vehicle 100 to travel in the automated driving to the destination 120 that is set by the destination setting unit (navigation device 16); the notification unit (HMI 34) configured to notify the vehicle occupant of the information; and the control instruction unit (ALC switch 60) configured to give the instruction to perform the automated lane change control in which the travel control required for the movement from the travel lane to the target lane is automatically performed as the lane change control performed in the lane change in accordance with the vehicle occupant's operation, wherein when the automated driving to the destination 120 that is set by the destination setting unit (navigation device 16) is performed, if the instruction by the control instruction unit (ALC switch 60) is given, the automated driving control unit (calculation device 68) is configured to perform the automated lane change control, and if the instruction is not given by the control instruction unit (ALC switch 60), the automated driving control unit (calculation device 68) is configured to perform the lane change assistance control in which the guidance of the lane change is provided to the vehicle occupant through the notification unit (HMI 34) (first example).

In the above configuration, the vehicle control device 10 includes the control instruction unit (ALC switch 60). Thus, the lane change can be performed as the vehicle occupant likes.

In the present invention, the vehicle control device 10 may further include the approval instruction unit (blinker switch 58) configured to give the instruction expressing the vehicle occupant's intention of approving or disapproving the lane change in accordance with the vehicle occupant's operation, wherein the automated lane change control may include the first automated lane change control (conditionally automated lane change control) in which after the timing or the position of the lane change is determined, the vehicle occupant is asked whether to change lanes through the notification unit (HMI 34), and if the approval instruction unit (blinker switch 58) gives the instruction expressing the intention of approving the lane change, the travel control required for the movement from the travel lane to the target lane is automatically performed, and the second automated lane change control (fully automated lane change control) in which after the timing or the position of the lane change is determined, the travel control required for the movement from the travel lane to the target lane is automatically performed regardless of the instruction by the approval instruction unit (blinker switch 58).

In the present invention, the vehicle control device 10 may further include the behavior detection unit (vehicle body behavior sensor 22) configured to detect the behavior of the host vehicle 100, wherein when the automated driving instruction unit (automated driving switch 56) gives the instruction to start the automated driving, if the behavior of the host vehicle 100 detected by the behavior detection unit (vehicle body behavior sensor 22) satisfies the predetermined condition (for example, Vmin≤V−V1≤Vmax), the automated driving control unit (calculation device 68) may be configured to set the automated driving state where the automated lane change control is performed, and if the behavior of the host vehicle 100 detected by the behavior detection unit (vehicle body behavior sensor 22) does not satisfy the predetermined condition, the automated driving control unit may be configured to set the automated driving state (destination guidance mode) where the lane change assistance control is performed (second example).

In the above configuration, if the behavior of the host vehicle 100 does not satisfy the predetermined condition at the start of the automated driving, the destination guidance mode is set. Thus, in a case where the behavior of the host vehicle 100 does not suit the external travel environment, the lane change can be performed mainly by the vehicle occupant.

In the present invention, the vehicle control device 10 may further include the external environment detection unit (external environment sensor 14) configured to detect the travel environment around the host vehicle 100, wherein when the automated driving instruction unit (blinker switch 58) gives the instruction to start the automated driving, if the travel environment detected by the external environment detection unit (external environment sensor 14) satisfies the predetermined condition (for example, lane mark can be recognized), the automated driving control unit (calculation device 68) may be configured to set the automated driving state where the automated lane change control is performed, and if the travel environment detected by the external environment detection unit (external environment sensor 14) does not satisfy the predetermined condition, the automated driving control unit (calculation device 68) may be configured to set the automated driving state (destination guidance mode) where the lane change assistance control is performed (second example).

In the above configuration, if the travel environment does not satisfy the predetermined condition at the start of the automated driving, the destination guidance mode is set. Thus, in a case where the automated lane change control cannot be performed stably in the travel environment, the lane change can be performed mainly by the vehicle occupant.

In the present invention, the vehicle control device 10 may further include the cancel instruction unit (blinker switch 58) configured to give the instruction expressing the vehicle occupant's intention of canceling the automated lane change control in accordance with the vehicle occupant's operation, wherein if the cancel instruction unit (blinker switch 58) gives the instruction expressing the intention of canceling the automated lane change control in the automated lane change control, the automated driving control unit (calculation device 68) may be configured to change the automated driving state from the automated driving state (destination lead mode) where the automated lane change control is performed to the automated driving state (destination guidance mode) where the lane change assistance control is performed (third example).

In the above configuration, in the case where the destination lead mode is set against the vehicle occupant's intention, the automated driving mode can be changed to the destination guidance mode.

In the present invention, if the cancel instruction unit (blinker switch 58) gives the instruction expressing the intention of canceling the automated lane change control in the automated lane change control, the automated driving control unit (calculation device 68) may be configured to cancel the automated lane change control and count the number of cancellations Nc or count the number of interventions Ni in the travel control using the steering wheel in the automated lane change control, and if the number of cancellations Nc or the number of interventions Ni is more than or equal to the predetermined number of times Ncth, Nith, the automated driving control unit may be configured to change the automated driving state from the automated driving state (destination lead mode) where the automated lane change control is performed to the automated driving state (destination guidance mode) where the lane change assistance control is performed (third example).

In the above configuration, in the case where the destination lead mode is set against the vehicle occupant's intention, the automated driving mode can be changed to the destination guidance mode.

In the present invention, if the elapsed time from the previous intention of the cancellation to the latest intention of the cancellation or the elapsed time from the previous intervention to the latest intervention is less than the predetermined time, the automated driving control unit (calculation device 68) may be configured to change the automated driving state from the automated driving state where the automated lane change control is performed to the automated driving state where the lane change assistance control is performed (third example).

In the above configuration, the vehicle control device 10 can distinguish the case where the destination lead mode is set against the vehicle occupant's intention and the case where the vehicle occupant recognizes the destination lead mode and the lane change control is performed at his desired timing.

In the present invention, the automated driving control unit (calculation device 68) may be configured to start to measure the time if the cancel instruction unit (blinker switch 58) gives the instruction expressing the intention of canceling the automated lane change control in the automated lane change control, suppress the automated lane change control more than usual until the elapsed time from the start of the time measurement exceeds the predetermined time, return the automated lane change control to the normal automated lane change control after the predetermined time has elapsed from the start of the time measurement, and perform the normal automated lane change control in the case where the control instruction unit (ALC switch 60) gives the instruction to perform the automated lane change control again within the predetermined time from the start of the time measurement.

In the present invention, if the vehicle occupant requests the lane change operation in accordance with guidance in the lane change assistance control, the automated driving control unit (calculation device 68) may be configured to provide the vehicle occupant with the guidance of the change from the automated driving state (destination guidance mode) where the lane change assistance control is performed to the automated driving state (destination lead mode) where the automated lane change control is performed through the notification unit (HMI 34) (fourth example).

In the above configuration, in the case where the destination guidance mode is set against the vehicle occupant's intention, for example, the vehicle occupant forgets to set the destination lead mode, the automated driving mode can be changed to the destination lead mode.

In the present invention, the vehicle control device 10 may further include the condition setting unit (customization switch 62) configured to set the operation condition of the automated lane change control in accordance with the vehicle occupant's operation, wherein the automated driving control unit (calculation device 68) may be configured to perform the automated lane change control in accordance with the operation condition that is set by the condition setting unit (fifth example).

In the above configuration, the vehicle occupant can freely set the lane change control.

In the present invention, the vehicle control device 10 may further include: the position specification unit (navigation device 16, positioning unit 18) configured to specify the current position of the host vehicle 100; the first map 46 for generating the route from the current position to the destination 120; and the second map 52 including the map information that is more specific than that of the first map 46, wherein if the second map 52 includes the specific map information including the current position specified by the position specification unit (navigation device 16, positioning unit 18) in the lane change control, the automated driving control unit (calculation device 68) may be configured to perform the automated lane change control (sixth example).

In the above configuration, even in a case where the host vehicle 100 moves from the road 110 (for example, expressway) with the sufficient map information to the road 110 (for example, ordinary road in provinces) with the insufficient map information, the lane change can be performed for sure.

In the present invention, the vehicle control device 10 may further include the vehicle speed detection unit (vehicle speed sensor 54) configured to detect the vehicle speed V of the host vehicle 100, wherein if the vehicle speed V detected by the vehicle speed detection unit (vehicle speed sensor 54) is less than or equal to the predetermined vehicle speed Vth in the state where the control instruction unit (ALC switch 60) gives the instruction to perform the automated lane change control, the automated driving control unit (calculation device 68) may be configured to prohibit the automated lane change control (seventh example).

In the above configuration, if the vehicle speed V of the host vehicle 100 is decreased so that the relative speed between the host vehicle 100 and the other vehicle traveling in the travel lane to which the host vehicle 100 will shift is increased, the automated lane change control performed mainly by the device is prohibited. Thus, the lane change that does not suit the traffic situation is not performed.

In the present invention, if the automated driving instruction unit (automated driving switch 56) gives the instruction to start the automated driving in the state where the destination setting unit (navigation device 16) does not set the destination 120, the automated driving control unit (calculation device 68) may be configured to perform the automated driving in which the host vehicle 100 follows the road (first example).

Note that the vehicle control device according to the present invention is not limited to the above embodiment, and can employ various configurations without departing from the gist of the present invention.

What is claimed is:

1. A vehicle control device comprising:
   an automated driving switch configured to give an instruction to start automated driving in accordance with a vehicle occupant's operation;
   a first switch configured to give an instruction to perform automated lane change control in accordance with the vehicle occupant's operation during the automated driving, and to give an instruction to stop automated lane change control in accordance with the vehicle occupant's operation during the automated driving;
   a second switch configured to be switched between an on state and an off state in accordance with a vehicle occupant's on operation; and
   a human machine interface configured to notify a vehicle occupant of information; and
   one or more processors that execute computer-executable instructions stored in a memory,
   wherein the one or more processors execute the computer-executable instructions to cause the vehicle control device to:
   automatically determine a lane change timing or lane change position, and perform automated lane change control in which travel control required for movement from a travel lane to a target lane is automatically performed as lane change control performed in lane change; and
   perform lane change assistance control in which guidance of lane change is provided to the vehicle occupant through the human machine interface to assist the vehicle occupant in deciding the lane change timing or lane change position, as lane change control performed in lane change,
   automatically perform vehicle control of at least one of acceleration, deceleration, and steering regarding the lane change of a host vehicle as the automated driving, and
   if the automated driving switch gives the instruction to start the automated driving, cause the host vehicle to travel in the automated driving to a destination that is set beforehand, and
   when the automated driving is being performed toward the destination, perform the automated lane change control in the on state of the second switch, and perform the lane change assistance control in the off state of the second switch.

2. The vehicle control device according to claim 1, further comprising an approval switch configured to give an instruction expressing vehicle occupant's intention of approving or disapproving the lane change in accordance with the vehicle occupant's operation,
   wherein the automated lane change control includes first automated lane change control in which after a timing or a position of the lane change is determined, the vehicle occupant is asked whether to change lanes through the human machine interface, and if the approval switch gives the instruction expressing the intention of approving the lane change, the travel control required for the movement from the travel lane to the target lane is automatically performed, and second automated lane change control in which after the timing or the position of the lane change is determined, the travel control required for the movement from the travel lane to the target lane is automatically performed regardless of the instruction by the approval instruction switch.

3. The vehicle control device according to claim 1, further comprising:
   a behavior detection sensor configured to detect behavior of the host vehicle, wherein
   when the automated driving switch gives the instruction to start the automated driving, if the behavior of the host vehicle detected by the behavior detection sensor satisfies a predetermined condition ($Vmin \leq V-V1 \leq Vmax$), the one or more processors cause the vehicle control device to set an automated driving state where the automated lane change control is performed, and if the behavior of the host vehicle detected by the behavior detection sensor does not satisfy the predetermined condition, the one or more processors cause the vehicle control device to set the automated driving state where the lane change assistance control is performed.

4. The vehicle control device according to claim 1, further comprising:
   an external environment detection sensor configured to detect a travel environment around the host vehicle, wherein
   when the automated driving switch gives the instruction to start the automated driving, if the travel environment detected by the external environment detection sensor satisfies a predetermined condition, the one or more processors cause the vehicle control device to set an automated driving state where the automated lane change control is performed, and if the travel environment detected by the external environment detection sensor does not satisfy the predetermined condition, the one or more processors cause the vehicle control device to set the automated driving state where the lane change assistance control is performed.

5. The vehicle control device according to claim 1, further comprising a cancel switch configured to give an instruction expressing vehicle occupant's intention of canceling the automated lane change control in accordance with the vehicle occupant's operation,
  wherein if the cancel switch gives the instruction expressing the intention of canceling the automated lane change control in the automated lane change control, the one or more processors cause the vehicle control device to change the automated driving state from the automated driving state where the automated lane change control is performed to the automated driving state where the lane change assistance control is performed.

6. The vehicle control device according to claim 5, wherein if the cancel switch gives the instruction expressing the intention of canceling the automated lane change control in the automated lane change control, the one or more processors cause the vehicle control device to cancel the automated lane change control and count number of cancellations or count number of interventions in the travel control using a steering wheel in the automated lane change control, and if the number of cancellations or the number of interventions is more than or equal to a predetermined number of times, the one or more processors cause the vehicle control device to change the automated driving state from the automated driving state where the automated lane change control is performed to the automated driving state where the lane change assistance control is performed.

7. The vehicle control device according to claim 6, wherein if elapsed time from the previous intention of the cancellation to the latest intention of the cancellation or elapsed time from the previous intervention to the latest intervention is less than a predetermined time, the one or more processors cause the vehicle control device to change the automated driving state from the automated driving state where the automated lane change control is performed to the automated driving state where the lane change assistance control is performed.

8. The vehicle control device according to claim 6, wherein the one or more processors cause the vehicle control device to start to measure time if the cancel switch gives the instruction expressing the intention of canceling the automated lane change control in the automated lane change control, suppress the automated lane change control more than usual until elapsed time from the start of the time measurement exceeds a predetermined time, return the automated lane change control to normal automated lane change control after the predetermined time has elapsed from the start of the time measurement, and perform the normal automated lane change control in the on state of the second switch within the predetermined time from the start of the time measurement.

9. The vehicle control device according to claim 1, wherein if the vehicle occupant requests lane change operation in accordance with guidance in the lane change assistance control, the one or more processors cause the vehicle control device to provide the vehicle occupant with the guidance of change from an automated driving state where the lane change assistance control is performed to the automated driving state where the automated lane change control is performed through the human machine interface.

10. The vehicle control device according to claim 1, further comprising a condition setting switch configured to set an operation condition of the automated lane change control in accordance with the vehicle occupant's operation,
  wherein the one or more processors cause the vehicle control device to perform the automated lane change control in accordance with the operation condition that is set by the condition setting switch.

11. The vehicle control device according to claim 1, further comprising:
  a position specification device configured to specify a current position of the host vehicle;
  a first map for generating a route from the current position to the destination; and
  a second map including map information that is more specific than that of the first map,
  wherein if the second map includes specific map information including the current position specified by the position specification device in the lane change control, the one or more processors cause the vehicle control device to perform the automated lane change control.

12. The vehicle control device according to claim 1, further comprising a vehicle speed detection sensor configured to detect vehicle speed of the host vehicle,
  wherein if vehicle speed detected by the vehicle speed detection sensor is less than or equal to predetermined vehicle speed in the on state of the second switch, the one or more processors cause the vehicle control device to prohibit the automated lane change control.

13. The vehicle control device according to claim 1, wherein if the automated driving switch gives the instruction to start the automated driving in a state where the destination is not set, the one or more processors cause the vehicle control device to perform the automated driving in which the host vehicle follows a road.

14. The vehicle control device according to claim 1, wherein when the vehicle control device indicates the vehicle occupant's intention of performing the automated lane change control after the guidance of the lane change in the lane change assistance control, the one or more processors cause the vehicle control device to perform the lane change assistance control.

* * * * *